(12) United States Patent
Zhu et al.

(10) Patent No.: US 9,957,355 B2
(45) Date of Patent: *May 1, 2018

(54) DEVICE AND METHOD FOR SYNTHESIS OF A POLYMER UNDER SEPARATION OF A GASEOUS SUBSTANCE

(71) Applicant: BASF SE, Ludwigshafen (DE)

(72) Inventors: Ning Zhu, Mannheim (DE); Achim Stammer, Freinsheim (DE); Joachim Clauss, Darmstadt (DE); Gad Kory, Gaiberg (DE)

(73) Assignee: BASF SE, Ludwigshafen (DE)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/896,460

(22) PCT Filed: Jun. 11, 2014

(86) PCT No.: PCT/EP2014/062122
§ 371 (c)(1),
(2) Date: Feb. 3, 2016

(87) PCT Pub. No.: WO2014/198768
PCT Pub. Date: Dec. 18, 2014

(65) Prior Publication Data
US 2016/0159983 A1 Jun. 9, 2016

(30) Foreign Application Priority Data

Jun. 12, 2013 (EP) .................................... 13171654

(51) Int. Cl.
| | |
|---|---|
| *C08G 69/30* | (2006.01) |
| *B01J 19/00* | (2006.01) |
| *B01J 19/18* | (2006.01) |
| *C08F 2/00* | (2006.01) |
| *C08G 69/28* | (2006.01) |
| *C08L 77/06* | (2006.01) |
| *C08G 69/26* | (2006.01) |

(52) U.S. Cl.
CPC .......... *C08G 69/30* (2013.01); *B01J 19/0026* (2013.01); *B01J 19/1881* (2013.01); *C08F 2/002* (2013.01); *C08F 2/005* (2013.01); *C08G 69/265* (2013.01); *C08G 69/28* (2013.01); *C08L 77/06* (2013.01); *B01J 2219/00094* (2013.01); *B01J 2219/00168* (2013.01); *B01J 2219/00247* (2013.01); *B01J 2219/185* (2013.01)

(58) Field of Classification Search
CPC ...... C08L 77/06; B01J 19/0026; C08G 69/28; C08G 69/30
See application file for complete search history.

(56) References Cited

U.S. PATENT DOCUMENTS

| | | | |
|---|---|---|---|
| 551,987 A | 12/1895 | Mills | |
| 2,689,839 A | 9/1954 | Heckert | |
| 2,993,842 A | 7/1961 | Smith | |
| 3,113,843 A | 12/1963 | Li | |
| 3,545,938 A | 12/1970 | Perry | |
| 3,993,462 A * | 11/1976 | Jones | ..................... C08G 69/04 96/209 |
| 4,138,544 A | 2/1979 | Janssen et al. | |
| 4,429,107 A * | 1/1984 | Strehler | ................. C08G 69/46 526/67 |
| 5,362,448 A * | 11/1994 | Kawakami | ............... B01J 19/18 422/134 |
| 7,964,059 B2 | 6/2011 | Peters et al. | |
| 2014/0148561 A1 | 5/2014 | Paul et al. | |

FOREIGN PATENT DOCUMENTS

| | | |
|---|---|---|
| DE | 10 2006 047 942 B3 | 1/2008 |
| EP | 0 267 025 A1 | 5/1988 |
| EP | 2 471 594 A1 | 7/2012 |
| FR | 2335552 A1 | 7/1977 |

OTHER PUBLICATIONS

Alewelt, W., et al., "Industrial Thermoplastics: Polyamide," *Plastics Handbook*, 3/4, Carl Hanser Publishing Company, 1998, Munich, pp. 42-71.

* cited by examiner

*Primary Examiner* — Gregory Listvoyb
(74) *Attorney, Agent, or Firm* — Marshall, Gerstein & Borun LLP

(57) ABSTRACT

The invention relates to a device for synthesis of a polymer under separation of a gaseous substance. Said device comprises a reaction chamber (1), which has a top section (11), a middle section (12) and a bottom section (13), an inlet opening (2) which is arranged in the middle section (12), a first outlet opening (3) which is arranged in the bottom section (13), a second outlet opening (4) which is arranged in the top section (11), a first return opening (51), which is arranged in the bottom section (13), a second outlet opening (52), which is arranged under the top section (11), a distribution device (6), which is arranged between the top section (11) and the middle section (12), and a removal device (7) which is arranged to be movable along the top section (11). The invention further relates to a method for synthesis of a polymer which can be carried out in said device.

4 Claims, 4 Drawing Sheets

DEVICE AND METHOD FOR SYNTHESIS OF A POLYMER UNDER SEPARATION OF A GASEOUS SUBSTANCE

CROSS-REFERENCE TO RELATED APPLICATION

This is the U.S. national phase of International Application No. PCT/EP2014/062122, filed Jun. 11, 2014, which claims the benefit of European Patent application No. 13171654.0, filed Jun. 12, 2013.

BACKGROUND OF THE INVENTION

The present invention relates to a process for preparing an aliphatic or semiaromatic polyamide, in which a polyamide prepolymer is subjected to a solid state polymerization.

The present invention relates to an apparatus for synthesis of a polymer, especially of a polyamide, with separation of a gaseous substance, especially of water. The present invention further relates to a process for synthesizing a polymer, especially a polyamide, with separation of a gaseous substance, especially of water, which can especially be performed using the inventive apparatus.

STATE OF THE ART

A multitude of industrial polymers are prepared by a polycondensation in which the increase in molecular weight is accompanied by the release of a low molecular weight component, which generally has to be at least partly removed from the reaction mixture, for example in order to attain the desired molecular weight and/or the desired product properties.

An important class of polycondensation polymers is that of the polyamides. As well as the main fields of use in films, fibers and materials, they serve for a multitude of further end uses. Among the polyamides, polyamide-6 (polycaprolactam) and polyamide-6,6 (Nylon, polyhexamethyleneadipamide) are the polymers prepared in the largest volumes. Polyamide-6,6 is prepared predominantly by polycondensation of what are called AH salt solutions, i.e. of aqueous solutions comprising adipic acid and 1,6-diaminohexane (hexamethylenediamine) in stoichiometric amounts. The conventional process for preparing polyamide-6 is the hydrolytic ring-opening polymerization of ε-caprolactam, which is still of very great industrial significance. Conventional preparation processes for polyamide-6 and polyamide-6,6 are described, for example, in Kunststoffhandbuch, 3/4 Technische Thermoplaste: Polyamide [Plastics Handbook, 3/4 Industrial Thermoplastics: Polyamides], Carl Hanser Verlag, 1998, Munich, p. 42-71.

A specific class of industrial polymers which have found wide use is that of semicrystalline or amorphous thermoplastic semiaromatic polyamides, which are notable especially for their high thermal stability and are therefore also referred to as high-temperature polyamides (HTPAs).

Specifically in the synthesis of high-temperature polyamides, it is necessary to remove water from the reaction melt. Thus, the preparation of these HTPAs generally begins with the formation of an aqueous salt solution from at least one diamine and at least one dicarboxylic acid, and optionally further monomer components, such as lactams, ω-amino acids, monoamines, monocarboxylic acids and mixtures thereof, with the proviso that at least one of the components has an aromatic group. The formation of the salt solution is then followed by an oligomerization in the liquid phase, during which there is generally still no removal of water. At the end of this oligomerization, the oligomers have an average, for example, of 4 to 10 repeat units at a conversion of about 70 to 80%. To increase the molecular weight further, two alternative routes are then available. In the first variant, the oligomer formed is converted by dewatering to the solid phase and subjected to what is called a solid state polymerization (SSP). In the second variant, water is removed in a controlled manner and the temperature is increased to convert the aqueous solution to the melt for further polycondensation. There is a particular need for suitable apparatuses and processes for performing this melt condensation.

It is known, for example, that an oligomer melt comprising water can be reacted in a reactor at a temperature of about 350° C. and a pressure in the range from 10 to 20 bar. In the course of this, however, deposits occur on the inner walls of the reactor above the liquid phase. This leads to a deterioration in product quality.

The patent U.S. Pat. No. 2,689,839 describes passing a polyamide melt through tubes with different diameter while subjecting it to heat treatment. The tubes become ever broader, such that gradual decompression is effected at the outlet of the last tube, which is undertaken by means of a conveying screw. However, this process has the disadvantage that steam leaves the polyamide melt through the conveying screw, which can result in foaming of the polyamide melt.

The patent U.S. Pat. No. 3,113,843 describes a process for synthesizing a polyamide with separation of steam, in which a vertical conveying screw is used. This continuously mechanically cleans the inner surface of the reactor used.

Additionally known is polyamide synthesis in a falling-film reactor. This involves distributing an oligomer film onto a large inner surface of a reactor, the oligomers being supplied via a tube and optionally additionally also via a higher film inlet. This avoids the problem of foam formation in the melt as a result of outgassing of water close to the outlet orifice of the reactor. However, deposits in the reactor interior can form in this case above the inlet for the melt. Such a falling-film reactor is described, for example, in U.S. Pat. No. 5,561,987 A.

In order to be able to cover the entire inner surface of the falling-film reactor with the oligomer melt, the patent U.S. Pat. No. 7,964,059 B2 proposes mechanically applying the oligomer melt to the inner surface. However, the apparatus used for this purpose has many moving parts and hence a high surface area, which leads to the formation of deposits.

Document EP 2471594 A1 describes a reactor comprising an essentially tubular reactor housing and a process for continuous polymerization.

U.S. Pat. No. 2,993,842 A describes an apparatus for the distillation of liquids and a process for the fractional distillation of liquids.

EP 0267025 A1 describes a thin-film evaporator for high-viscosity fluids having a treatment chamber which is surrounded by a heating or cooling jacket and is equipped with a coaxial rotor.

DE 102006047942 B3 describes an apparatus having a horizontal cylindrical reactor housing and a process for the batchwise polycondensation of polymers.

FR 2335552 A1 describes a process and an apparatus for the preparation of polycondensates.

U.S. Pat. No. 3,545,938 A describes a vertical cylindrical chemical pressure reactor for the preparation and processing of viscous materials.

SUMMARY OF THE INVENTION

The invention firstly provides an apparatus for synthesis of a polymer with separation of a gaseous substance, said apparatus comprising a reaction space having an upper section, a middle section and a lower section, an inlet orifice disposed in the middle section, a first outlet orifice disposed in the lower section, a second outlet orifice disposed in the upper section, a first return orifice disposed in the lower section, a second return orifice disposed beneath the upper section, a distributing device disposed between the upper section and the middle section, and a removal device disposed so as to be movable along the upper section.

The invention further provides a process for synthesizing a polymer, comprising the feeding of a prepolymer melt into a middle section of a reaction space through an inlet orifice, the transportation of a portion of the prepolymer melt from a lower section of the reaction space disposed below the middle section into a section at the top of the middle section of the reaction space and the distribution of the prepolymer melt over the inner wall of the middle section by means of a distributing device, the polymerization of the prepolymer melt to give a polymer melt, the removal of the polymer melt from the reaction space through a first outlet orifice of the reaction space and the removal of a gaseous substance from the reaction space through a second outlet orifice in the upper section. In the process, deposits on at least one inner wall of the upper section are removed by a removal device.

A specific embodiment is a process for synthesizing an aliphatic or semiaromatic polyamide, in which a prepolymer of the aliphatic or semiaromatic polyamide is provided and supplied to the apparatus used in accordance with the invention. In a preferred embodiment of the invention, the apparatus for synthesis of a polymer under separation of a gaseous substance comprises:
- a reaction space having an upper section, a middle section and a lower section, with the middle section delimited in the direction of the lower section by a liquid level of a liquid phase of an oligomer melt disposed in the lower section in operation of the apparatus,
- an inlet orifice disposed in the middle section,
- a first outlet orifice disposed in the lower section,
- a second outlet orifice disposed in the upper section,
- a first return orifice disposed in the lower section,
- a second return orifice disposed beneath the upper section,
- a distributing device which delimits the upper section from the middle section, and
- a removal device disposed so as to be movable along the upper section.

In a preferred embodiment of the invention, the process for synthesis of a polymer comprises
a) feeding a prepolymer melt into a middle section of a reaction space through an inlet orifice,
b) forming a liquid phase as a lower section of the reaction space disposed beneath the middle section,
b) transporting a portion of the prepolymer melt from the liquid phase of the reaction space into an upper section of the reaction space above the middle section and distributing the prepolymer melt over the inner wall of the middle section by means of a distributing device,
c) polymerizing the prepolymer melt to give a polymer melt,
d) removing the polymer melt from the reaction space through a first outlet orifice of the reaction space, and
e) removing a gaseous substance from the reaction space through a second outlet orifice in the upper section, wherein deposits on at least one inner wall of the upper section are removed by a removal device.

DESCRIPTION OF THE INVENTION

A prepolymer in the context of the invention refers to a composition comprising polymeric compounds having complementary functional groups capable of a condensation reaction to increase the molecular weight.

The term "prepolymer melt" in the context of the present invention refers to a free-flowing composition of the respective reaction mixture comprising the prepolymers. In this context, the temperature of the prepolymer melt need not necessarily be above the melting temperature of the pure prepolymer. The flowability may also result from the presence of other components of the prepolymer melt, for example water, low molecular weight oligomers, etc. In a specific embodiment, the prepolymer itself is present in molten form in the prepolymer melt.

The figures for the number-average molecular weight $M_n$ and for the weight-average molecular weight $M_w$ in the context of this invention are each based on a determination by means of gel permeation chromatography (GPC). For calibration, PMMA was used as a polymer standard with low polydispersity.

The inventive apparatus prevents the formation of deposits in the reaction space in the area between the upper section and the middle section by means of the removal device, and in the middle and any lower section by means of a homogeneous prepolymer film formed on the inner wall of the reaction space. Since it is unnecessary to stop the process to manually remove deposits, it can especially be performed continuously.

The first return orifice and the second return orifice of the inventive apparatus can especially be connected to one another by a return line in which there is disposed a pump. This is set up to transport a liquid from the first return orifice to the second return orifice. The inventive apparatus enables application of the known principle of a falling-film reactor to avoid the formation of deposits in the middle section and in the lower section, since a melt transported via the return line into the upper section can be distributed homogeneously by the distributing device over the inner wall of the middle section and to any lower section. The formation of deposits in the upper section is prevented in accordance with the invention by the movement of the removal device.

Preferably, the removal device has a removal head disposed on the inner wall at the top of the middle section. More preferably, the thickness of the removal head decreases toward at least one of its edges. In this way, flexibility of the removal head at its edges can be obtained. More preferably, the removal head has, at right angles to the direction of movement of the removal device, a cross-sectional area greater than the cross-sectional area at the top of the middle section at right angles to the direction of movement of the removal device. The removal head can also make contact with the inner wall at the top of the middle section with deformation of its edges, as a result of which a high pressure is exerted on the inner wall of the reaction space and it is possible to remove even very stubborn deposits. Particularly preferably, the removal head has, at right angles to the direction of movement of the removal device, a cross-sectional area which covers at least the cross-sectional area of an inlet line at right angles to the direction of movement of the removal device. The removal head preferably has orifices which enable the passage of the gaseous substance. Alternatively, the removal head, in accordance with the invention. May also take the form of a knife or doctor blade. It is additionally possible that the removal device consists of a rope. The removal head allows effective elimination of the deposits on the inner wall. At the same time, the removal head itself has a minimum surface area, in order that a minimum level of deposits, if any, form on the removal head itself.

In a specific implementation, the inlet orifice of the inventive apparatus is connected by means of the inlet line to a wall of the upper section, the inlet line being conducted through an orifice in the removal head.

The cross section of the lower section preferably decreases from the middle section toward the first outlet orifice.

In order to avoid heat losses and, in the event of damage to the reactor, to prevent the escape of a polymer melt, the reaction space is preferably jacketed.

The invention further provides a process for synthesizing a polymer, comprising
- a) feeding a prepolymer melt into a middle section of a reaction space through an inlet orifice,
- b) transporting a portion of the prepolymer melt from a lower section of the reaction space disposed below the middle section into an upper section of the reaction space above the middle section and distributing the prepolymer melt over the inner wall of the middle section by means of a distributing device,
- c) polymerizing the prepolymer melt to give a polymer melt,
- d) removing the polymer melt from the reaction space through a first outlet orifice of the reaction space, and
- e) removing a gaseous substance from the reaction space through a second outlet orifice in the upper section, wherein deposits on at least one inner wall of the upper section are removed by a removal device.

In order to ensure complete wetting of the inner wall of the reaction space below the distributing device with oligomer, it is preferable that the viscosity of the oligomer melt is at least 1 mPa·s.

Preferably, the inventive apparatus is aligned essentially vertically. A vertical alignment is understood to mean an essentially perpendicular alignment of the inventive apparatus in the field of gravity. "Essentially perpendicular" is understood to mean a deviation of not more than 10°, preferably of not more than 5°, based on an ideally vertical alignment.

In order to enable reliable removal of the polymer melt from the reaction space, it is preferable that the speed with which the polymer melt moves toward the first outlet orifice rises with falling distance from the first outlet orifice.

In principle, the process according to the invention can be performed with any polymer that can be converted to a melt. The polymer is preferably selected from thermoplastic polymers. The polymer is more preferably selected from polyamides, thermoplastic polyurethanes, polyolefins, vinylaromatic polymers, polyesters, polyacetals, polycarbonates, polysulfones, polyether sulfones and mixtures thereof.

Preferably, the polymer is a polyamide and the gaseous substance is steam.

A specific embodiment of the process according to the invention is therefore a process for synthesizing an aliphatic or semiaromatic polyamide, in which, in step a), a prepolymer of the aliphatic or semiaromatic polyamide is provided and supplied to the apparatus used in accordance with the invention.

The polyamides are designated in the context of the invention using abbreviations, some of which are customary in the art, which consist of the letters PA followed by numbers and letters. Some of these abbreviations are standardized in DIN EN ISO 1043-1. Polyamides which can be derived from aminocarboxylic acids of the $H_2N—(CH_2)_x—COOH$ type or the corresponding lactams are identified as PA Z where Z denotes the number of carbon atoms in the monomer. For example, PA 6 represents the polymer of ε-caprolactam or of ω-aminocaproic acid. Polyamides which derive from diamines and dicarboxylic acids of the $H_2N—(CH_2)_x—NH_2$ and $HOOC—(CH_2)_y—COOH$ types are identified as PA Z1Z2 where Z1 denotes the number of carbon atoms in the diamine and Z2 the number of carbon atoms in the dicarboxylic acid. Copolyamides are designated by listing the components in the sequence of their proportions, separated by slashes. For example, PA 66/610 is the copolyamide of hexamethylenediamine, adipic acid and sebacic acid. For the monomers having an aromatic or cycloaliphatic group which are used in accordance with the invention, the following letter abbreviations are used:

T=terephthalic acid, I=isophthalic acid, MXDA=m-xylylenediamine, IPDA=isophoronediamine, PACM=4,4'-methylenebis(cyclohexylamine), MACM=2,2'-dimethyl-4,4'-methylenebis(cyclohexylamine)

Hereinafter, the expression "$C_1$-$C_4$-alkyl" comprises unsubstituted straight-chain and branched $C_1$-$C_4$-alkyl groups. Examples of $C_1$-$C_4$-alkyl groups are especially methyl, ethyl, propyl, isopropyl, n-butyl, isobutyl, sec-butyl, tert-butyl (1,1-dimethylethyl).

In the aromatic dicarboxylic acids, aliphatic dicarboxylic acids, cycloaliphatic dicarboxylic acids and monocarboxylic acids mentioned hereinafter, the carboxyl groups may each be present in underivatized form or in the form of derivatives. In the case of dicarboxylic acids, neither carboxyl group, one carboxyl group or both carboxyl groups may be in the form of a derivative. Suitable derivatives are anhydrides, esters, acid chlorides, nitriles and isocyanates. Preferred derivatives are anhydrides or esters. Anhydrides of dicarboxylic acids may be in monomeric or in polymeric form. Preferred esters are alkyl esters and vinyl esters, more preferably $C_1$-$C_4$-alkyl esters, especially the methyl esters or ethyl esters. Dicarboxylic acids are preferably in the form of mono- or dialkyl esters, more preferably mono- or di-$C_1$-$C_4$-alkyl esters, more preferably monomethyl esters, dimethyl esters, monoethyl esters or diethyl esters. Dicarboxylic acids are additionally preferably in the form of mono- or divinyl esters. Dicarboxylic acids are additionally preferably in the form of mixed esters, more preferably mixed esters with different $C_1$-$C_4$-alkyl components, especially methyl ethyl esters.

The polyamide prepolymer is provided by polycondensation of an aqueous composition comprising at least one component suitable for polyamide formation.

Preferably, the prepolymer (and accordingly the aliphatic or semiaromatic polyamide) comprises incorporated components selected from
- A) unsubstituted or substituted aromatic dicarboxylic acids and derivatives of unsubstituted or substituted aromatic dicarboxylic acids,
- B) unsubstituted or substituted aromatic diamines,
- C) aliphatic or cycloaliphatic dicarboxylic acids and derivatives thereof,
- D) aliphatic or cycloaliphatic diamines,
- E) monocarboxylic acids and derivatives thereof,
- F) monoamines,
- G) at least trifunctional amines,
- H) lactams,
- I) ω-amino acids, K) compounds which are different than A) to I) and are cocondensable therewith.

A suitable embodiment is aliphatic polyamides. For aliphatic polyamides of the PA Z1 Z2 type (such as PA 66), the proviso applies that at least one components C) and D) must be present and neither of components A) and B) may be present. For aliphatic polyamides of the PA Z type (such as PA 6 or PA 12), the proviso applies that at least component H) must be present.

A preferred embodiment is semiaromatic polyamides. For semiaromatic polyamides, the proviso applies that at least one of components A) and B) and at least one of components C) and D) must be present.

The aromatic dicarboxylic acids A) are preferably selected from in each case unsubstituted or substituted phthalic acid, terephthalic acid, isophthalic acid, naphthalenedicarboxylic acids or diphenyldicarboxylic acids, and the derivatives and mixtures of the aforementioned aromatic dicarboxylic acids.

Substituted aromatic dicarboxylic acids A) preferably have at least one (e.g. 1, 2, 3 or 4) $C_1$-$C_4$-alkyl radical. More particularly, substituted aromatic dicarboxylic acids A) have 1 or 2 $C_1$-$C_4$-alkyl radicals. These are preferably selected from methyl, ethyl, n-propyl, isopropyl, n-butyl, isobutyl, sec-butyl and tert-butyl, more preferably methyl, ethyl and n-butyl, particularly methyl and ethyl and especially methyl. Substituted aromatic dicarboxylic acids A) may also bear further functional groups which do not disrupt the amidation, for example 5-sulfoisophthalic acid, and salts and derivatives thereof. A preferred example thereof is the sodium salt of dimethyl 5-sulfoisophthalate.

Preferably, the aromatic dicarboxylic acid A) is selected from unsubstituted terephthalic acid, unsubstituted isophthalic acid, unsubstituted naphthalenedicarboxylic acids, 2-chloroterephthalic acid, 2-methylterephthalic acid, 5-methylisophthalic acid and 5-sulfoisophthalic acid.

More preferably, the aromatic dicarboxylic acid A) used is terephthalic acid, isophthalic acid or a mixture of terephthalic acid and isophthalic acid.

Preferably, the semiaromatic polyamide prepolymers provided in accordance with the invention have a proportion of aromatic dicarboxylic acids among all the dicarboxylic acids of at least 50 mol %, more preferably of 70 mol % to 100 mol %. In a specific embodiment, the semiaromatic polyamides prepared by the process according to the invention (and the prepolymers provided in step a)) have a proportion of terephthalic acid or isophthalic acid or a mixture of terephthalic acid and isophthalic acid, based on all the dicarboxylic acids, of at least 50 mol %, preferably of 70 mol % to 100 mol %.

The aromatic diamines B) are preferably selected from bis(4-aminophenyl)methane, 3-methylbenzidine, 2,2-bis(4-aminophenyl)propane, 1,1-bis(4-aminophenyl)cyclohexane, 1,2-diaminobenzene, 1,4-diaminobenzene, 1,4-diaminonaphthalene, 1,5-diaminonaphthalene, 1,3-diaminotoluene(s), m-xylylenediamine, N,N'-dimethyl-4,4'-biphenyldiamine, bis(4-methylaminophenyl)methane, 2,2-bis(4-methylaminophenyl)propane or mixtures thereof.

The aliphatic or cycloaliphatic dicarboxylic acids C) are preferably selected from oxalic acid, malonic acid, succinic acid, glutaric acid, adipic acid, pimelic acid, suberic acid, azelaic acid, sebacic acid, undecane-α,ω-dicarboxylic acid, dodecane-α,ω-dicarboxylic acid, maleic acid, fumaric acid or itaconic acid, cis- and trans-cyclohexane-1,2-dicarboxylic acid, cis- and trans-cyclohexane-1,3-dicarboxylic acid, cis- and trans-cyclohexane-1,4-dicarboxylic acid, cis- and trans-cyclopentane-1,2-dicarboxylic acid, cis- and trans-cyclopentane-1,3-dicarboxylic acid and mixtures thereof.

The aliphatic or cycloaliphatic diamines D) are preferably selected from ethylenediamine, propylenediamine, tetramethylenediamine, heptamethylenediamine, hexamethylenediamine, pentamethylenediamine, octamethylenediamine, nonamethylenediamine, 2-methyl-1,8-octamethylenediamine, decamethylenediamine, undecamethylenediamine, dodecamethylenediamine, 2-methylpentamethylenediamine, 2,2,4-trimethylhexamethylenediamine, 2,4,4-trimethylhexamethylenediamine, 5-methylnonamethylenediamine, 2,4-dimethyloctamethylenediamine, 5-methylnonanediamine, bis(4-am inocyclohexyl)methane, 3,3'-dimethyl-4,4'-diaminodicyclohexylmethane and mixtures thereof.

More preferably, the diamine D) is selected from hexamethylenediamine, 2-methylpentamethylenediamine, octamethylenediamine, nonamethylenediamine, decamethylenediamine, undecamethylenediamine, dodecamethylenediamine, bis(4-aminocyclohexyl)methane, 3,3'-dimethyl-4,4'-diaminodicyclohexylmethane and mixtures thereof.

In a specific implementation, the semiaromatic polyamides comprise at least one copolymerized diamine D) selected from hexamethylenediamine, bis(4-aminocyclohexyl)methane (PACM), 3,3'-dimethyl-4,4'-diaminodicyclohexylmethane (MACM), isophoronediamine (IPDA) and mixtures thereof.

In a specific implementation, the semiaromatic polyamides comprise exclusively hexamethylenediamine as the copolymerized diamine D).

In a further specific implementation, the semiaromatic polyamides comprise exclusively bis(4-aminocyclohexyl)methane as the copolymerized diamine D).

In a further specific implementation, the semiaromatic polyamides comprise exclusively 3,3'-dimethyl-4,4'-diaminodicyclohexylmethane (MACM) as the copolymerized diamine D).

In a further specific implementation, the semiaromatic polyamides comprise exclusively isophoronediamine (IPDA) as the copolymerized diamine D).

The prepolymers (and correspondingly the aliphatic and the semiaromatic polyamides) may comprise at least one copolymerized monocarboxylic acid E). The monocarboxylic acids E) serve to end-cap the polyamides prepared in accordance with the invention. Suitable monocarboxylic acids are in principle all of those capable of reacting with at least some of the amino groups available under the reaction conditions of the polyamide condensation. Suitable monocarboxylic acids E) are aliphatic monocarboxylic acids, alicyclic monocarboxylic acids and aromatic monocarboxylic acids. These include acetic acid, propionic acid, n-, iso- or tert-butyric acid, valeric acid, trimethylacetic acid, caproic acid, enanthic acid, caprylic acid, pelargonic acid, capric acid, undecanoic acid, lauric acid, tridecanoic acid, myristic acid, palmitic acid, stearic acid, pivalic acid, cyclohexanecarboxylic acid, benzoic acid, methylbenzoic acids, α-naphthalenecarboxylic acid, β-naphthalenecarboxylic acid, phenylacetic acid, oleic acid, ricinoleic acid, linoleic acid, linolenic acid, erucic acid, fatty acids from soya, linseeds, castor oil plants and sunflowers, acrylic acid, methacrylic acid, Versatic® acids, Koch® acids and mixtures thereof.

If the monocarboxylic acids E) used are unsaturated carboxylic acids or derivatives thereof, it may be advisable to work in the presence of commercial polymerization inhibitors.

More preferably, the monocarboxylic acid E) is selected from acetic acid, propionic acid, benzoic acid and mixtures thereof.

In a specific implementation, the prepolymers (and correspondingly the aliphatic and the semiaromatic polyamides) comprise exclusively propionic acid as the copolymerized monocarboxylic acid E).

In a further specific implementation, the prepolymers (and correspondingly the aliphatic and the semiaromatic polyamides) comprise exclusively benzoic acid as the copolymerized monocarboxylic acid E).

In a further specific implementation, the prepolymers (and correspondingly the aliphatic and the semiaromatic polyamides) comprise exclusively acetic acid as the copolymerized monocarboxylic acid E).

The prepolymers (and correspondingly the aliphatic and the semiaromatic polyamides) may comprise at least one copolymerized monoamine F). In this context, the aliphatic polyamides comprise only copolymerized aliphatic monoamines or alicyclic monoamines. The monoamines F) serve to end-cap the polyamides prepared in accordance with the invention. Suitable monoamines are in principle all of those capable of reacting with at least some of the carboxylic acid groups available under the reaction conditions of the polyamide condensation. Suitable monoamines F) are aliphatic monoamines, alicyclic monoamines and aromatic monoamines. These include methylamine, ethylamine, propylamine, butylamine, hexylamine, heptylamine, octylamine, decylamine, stearylamine, dimethylamine, diethylamine, dipropylamine, dibutylamine, cyclohexylamine, dicyclohexylamine, aniline, toluidine, diphenylamine, naphthylamine and mixtures thereof.

For preparation of the prepolymers (and correspondingly of the aliphatic and the semiaromatic polyamides), it is additionally possible to use at least one at least trifunctional amine G). These include N'-(6-aminohexyl)hexane-1,6-diamine, N'-(12-aminododecyl)dodecane-1,12-diamine, N'-(6-aminohexyl)dodecane-1,12-diamine, N'-[3-(aminomethyl)-3,5,5-trimethylcyclohexyl]hexane-1,6-diamine, N'-[3-(aminomethyl)-3,5,5-trimethylcyclohexyl]dodecane-1,12-diamine, N'-[(5-amino-1,3,3-trimethylcyclohexyl)methyl]hexane-1,6-diamine, N'-[(5-amino-1,3,3-trimethylcyclohexyl)methyl]dodecane-1,12-diamine, 3-[[[3-(aminomethyl)-3,5,5-trimethylcyclohexyl]amino]methyl]-3,5,5-trimethylcyclohexanamine, 3-[[(5-amino-1,3,3-trimethylcyclohexyl)methylamino]methyl]-3,5,5-trimethylcyclohexanamine, 3-(aminomethyl)-N-[3-(aminomethyl)-3,5,5-trimethylcyclohexyl]-3,5,5-trimethylcyclohexanamine. Preferably, no at least trifunctional amines G) are used.

Suitable lactams H) are ε-caprolactam, 2-piperidone (δ-valerolactam), 2-pyrrolidone (γ-butyrolactam), capryllactam, enantholactam, lauryllactam and mixtures thereof.

Suitable ω-amino acids 1) are ε-aminocaproic acid, 7-aminoheptanoic acid, 11-aminoundecanoic acid, 12-aminododecanoic acid, and mixtures thereof.

Suitable compounds K) which are different than A) to I) and are cocondensable therewith are at least tribasic carboxylic acids, diaminocarboxylic acids, etc.

Suitable compounds K) are additionally 4-[(Z)—N-(6-aminohexyl)-C-hydroxycarbonimidoyl]benzoic acid, 3-[(Z)—N-(6-aminohexyl)-C-hydroxycarbonimidoyl]benzoic acid, (6Z)-6-(6-aminohexylimino)-6-hydroxyhexanecarboxylic acid, 4-[(Z)—N-[(5-amino-1,3,3-trimethylcyclohexyl)methyl]-C-hydroxycarbonimidoyl]benzoic acid, 3-[(Z)—N-[(5-amino-1,3,3-trimethylcyclohexyl)methyl]-C-hydroxycarbonimidoyl]benzoic acid, 4-[(Z)—N-[3-(aminomethyl)-3,5,5-trimethylcyclohexyl]-C-hydroxycarbonimidoyl]benzoic acid, 3-[(Z)—N-[3-(aminomethyl)-3,5,5-trimethylcyclohexyl]-C-hydroxycarbonimidoyl]benzoic acid and mixtures thereof.

In a preferred embodiment, the process according to the invention serves for preparation of an aliphatic polyamide.

In that case, the polyamide is preferably selected from PA 6, PA 11, PA 12, PA 46, PA 66, PA 666, PA 69, PA 610, PA 612, PA 96, PA 99, PA 910, PA 912, PA 1212, and copolymers and mixtures thereof.

More particularly, the aliphatic polyamide is PA 6, PA 66 or PA 666, most preferably PA 6.

In a further preferred embodiment, the process according to the invention serves for preparation of a semiaromatic polyamide.

In that case, the polyamide is preferably selected from PA 6.T, PA 9.T, PA 8.T, PA 10.T, PA 12.T, PA 6.I, PA 8.I, PA 9.I, PA 10.I, PA 12.I, PA 6.T/6, PA 6.T/10, PA 6.T/12, PA 6.T/6.I, PA6.T/8.T, PA 6.T/9.T, PA 6.T/10T, PA 6.T/12.T, PA 12.T/6.T, PA 6.T/6.I/6, PA 6.T/6.I/12, PA 6.T/6.I/6.10, PA 6.T/6.I/6.12, PA 6.T/6.6, PA 6.T/6.10, PA 6.T/6.12, PA 10T/6, PA 10.T/11, PA 10.T/12, PA 8.T/6.T, PA 8.T/66, PA 8.T/8.I, PA 8.T/8.6, PA 8.T/6.I, PA 10.T/6.T, PA 10.T/6.6, PA 10.T/10.I, PA 10T/10.I/6.T, PA 10.T/6.I, PA 4.T/4.I/46, PA 4.T/4.I/6.6, PA 5.T/5.I, PA 5.T/5.I/5.6, PA 5.T/5.I/6.6, PA 6.T/6.I/6.6, PA MXDA.6, PA IPDA.I, PA IPDA.T, PA MACM.I, PA MACM.T, PA PACM.I, PA PACM.T, PA MXDA.I, PA MXDA.T, PA 6.T/IPDA.T, PA 6.T/MACM.T, PA 6.T/PACM.T, PA 6.T/MXDA.T, PA 6.T/6.I/8.T/8.I, PA 6.T/6.I/10.T/10.I, PA 6.T/6.I/IPDA.T/IPDA.I, PA 6.T/6.I/MXDA.T/MXDA.I, PA 6.T/6.I/MACM.T/MACM.I, PA 6.T/6.I/PACM.T/PACM.I, PA 6.T/10.T/IPDA.T, PA 6.T/12.T/IPDA.T, PA 6.T/10.T/PACM.T, PA 6.T/12.T/PACM.T, PA 10.T/IPDA.T, PA 12.T/IPDA.T and copolymers and mixtures thereof.

In that case, the polyamide is more preferably selected from PA 6.T, PA 9.T, PA 10.T, PA 12.T, PA 6.I, PA 9.I, PA 10.I, PA 12.I, PA 6.T/6.I, PA 6.T/6, PA6.T/8.T, PA 6.T/10T, PA 10.T/6.T, PA 6.T/12.T, PA12.T/6.T, PA IPDA.I, PA IPDA.T, PA 6.T/IPDA.T, PA 6.T/6.I/IPDA.T/IPDA.I, PA 6.T/10.T/IPDA.T, PA 6.T/12.T/IPDA.T, PA 6.T/10.T/PACM.T, PA 6.T/12.T/PACM.T, PA 10.T/IPDA.T, PA 12.T/IPDA.T and copolymers and mixtures thereof.

In a specific implementation, the semiaromatic polyamide is PA 6.T/6.I.

In a further specific implementation, the semiaromatic polyamide is PA 6.T/6.I/IPDA.T/IPDA.I.

In a further specific implementation, the semiaromatic polyamide is PA 6.T/6.I/MXDA.T/MXDA.I.

For preparation of the prepolymers provided in accordance with the invention, an aqueous composition comprising at least one component suitable for polyamide formation is generally used. The prepolymers can in principle be prepared by customary processes known to those skilled in the art. A suitable process for preparing semiaromatic polyamide oligomers is described, for example, in EP 0 693 515 A1.

The prepolymers (especially the polyamide prepolymers) provided for use in the process according to the invention preferably have a number-average molecular weight $M_n$ of about 500 to about 12 000 g/mol, preferably of about 1000 to 4000 g/mol.

In principle, the process according to the invention can be performed in any apparatus suitable therefor. Preference is given, however, to performing it in the above-described inventive apparatus.

If the process according to the invention is used to prepare aliphatic polyamides, they preferably have a number-average molecular weight $M_n$ within a range from 13 000 to 28 000 g/mol.

If the process according to the invention is used to prepare semiaromatic polyamides, they preferably have a number-average molecular weight $M_n$ within a range from 13 000 to 25 000 g/mol, more preferably of 15 000 to 20 000 g/mol.

The aliphatic polyamides obtained by the process according to the invention preferably have a weight-average molecular weight $M_w$ within a range from 20 000 to 140 000 g/mol.

The semiaromatic polyamides obtained by the process according to the invention preferably have a weight-average molecular weight $M_w$ within a range from 25 000 to 125 000 g/mol.

The aliphatic and semiaromatic polyamides obtained by the process according to the invention preferably have a polydispersity PD ($=M_w/M_n$) not exceeding 6, more preferably not exceeding 5, especially not exceeding 3.5.

DESCRIPTION OF FIGURES AND EXAMPLES

The invention will now be illustrated by working examples with reference to the drawings.

Figure 1:
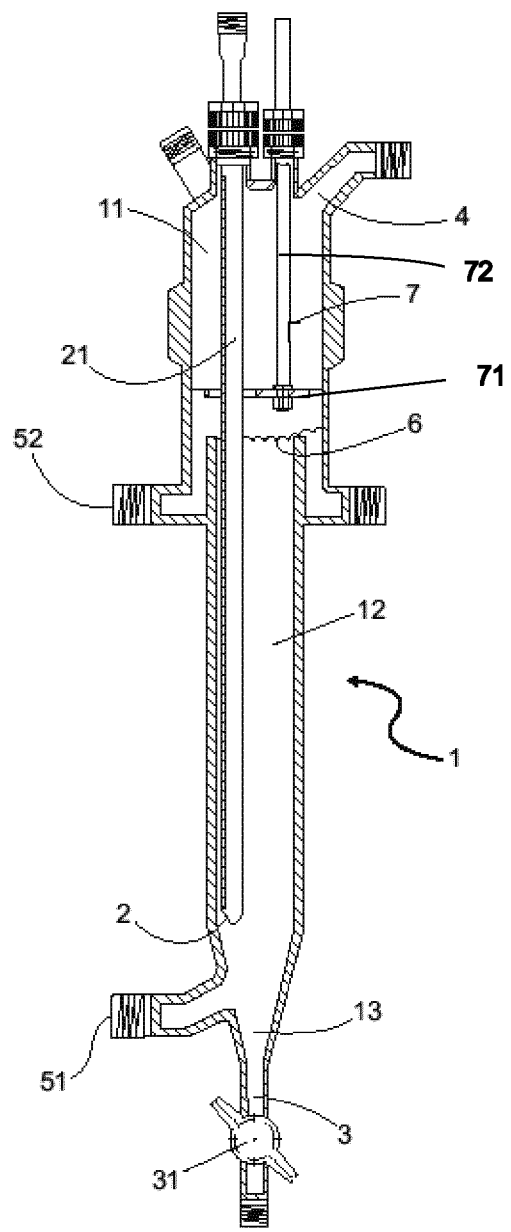
FIG. 1 shows a section through an apparatus in one embodiment of the invention.
Figure 2:
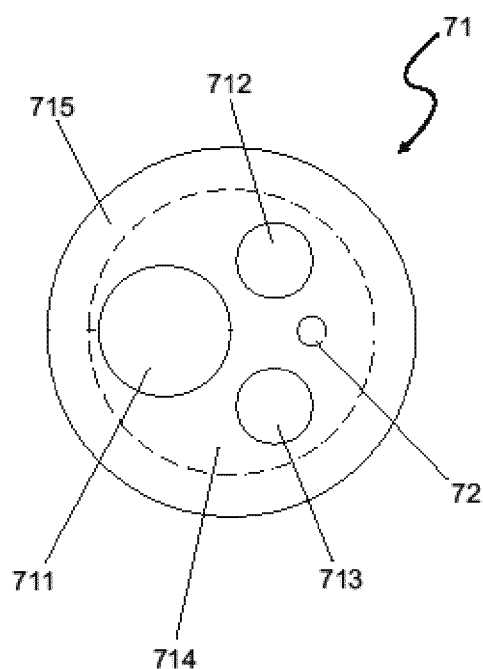
FIG. 2 shows a top view of the removal head of the apparatus according to FIG. 1.
Figure 3:
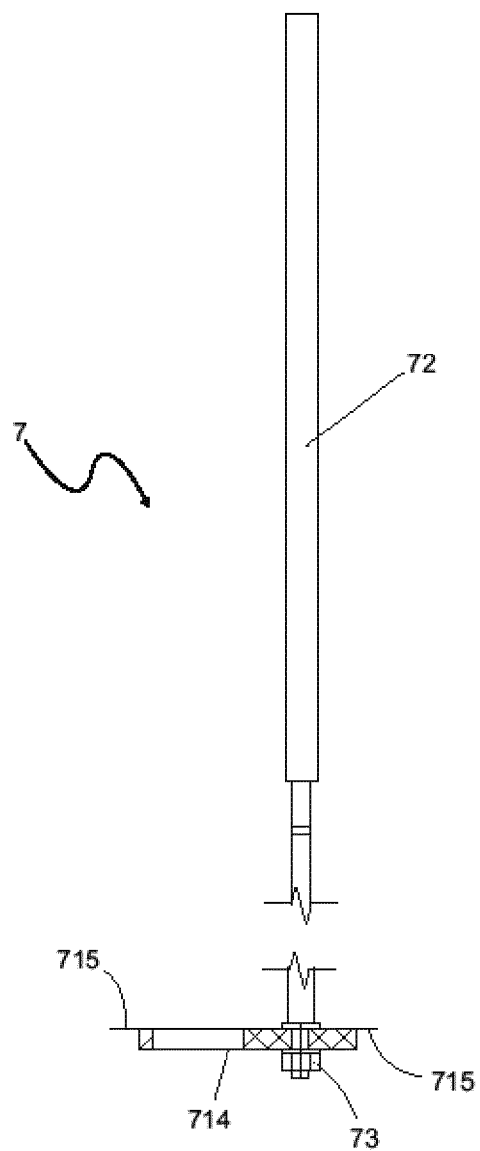
FIG. 3 shows a detailed drawing of the removal device having a removal head according to FIGS. 1 and 2.

FIGS. 1 to 3 show an embodiment of the inventive apparatus for synthesis of a polymer with separation of a gaseous substance. A reaction space 1 is divided into a cylindrical upper section 11, a cylindrical middle section 12 and a lower section 13. An inlet line 21 which is conducted through the top of the upper section 11 ends in an inlet orifice 2 in the middle section 12. The bottom of the lower section 13 ends in a first outlet orifice 3, which can be closed with a gate valve 31. The cross section of the lower section 13 decreases from the middle section 12 toward the first outlet orifice 3. A second outlet orifice 4 is disposed in the upper section 11. A first return orifice 51 is disposed in the lower section 13 and a second return orifice 52 in the upper section 11. A distributing device 6 is disposed at the top of the middle section 12. The latter takes the form of a ring gear having, for example, eighty-six teeth. In the upper section 11 is disposed a removal device 7 so as to be movable along the longitudinal axis of the reaction space 1. This consists of a removal head 71 made of polytetrafluoroethylene (Teflon® from DuPont de Nemours GmbH) and a rod 72 made of stainless steel, on which the removal head 71 is secured with a nut 73. The removal head 71 has an orifice 711 through which the inlet line 21 is conducted. Further orifices 712, 713 in the removal head 71 enable the passage of a gaseous substance. The orifices 711, 712, 713 and the connection to the rod 72 are disposed in a middle region 714 of the removal head 71, which is thicker than the edge 715 of the removal head 71. For example, the inner region 714 may have a thickness of 6 mm and the edge 715 a thickness of 0.5 mm. The diameter of the removal head 71 is 1 mm greater than the internal diameter at the top of the middle section 12. Movement of the removal device is possible through deformation of the edge 715 of the removal head 71.

Figure 4:
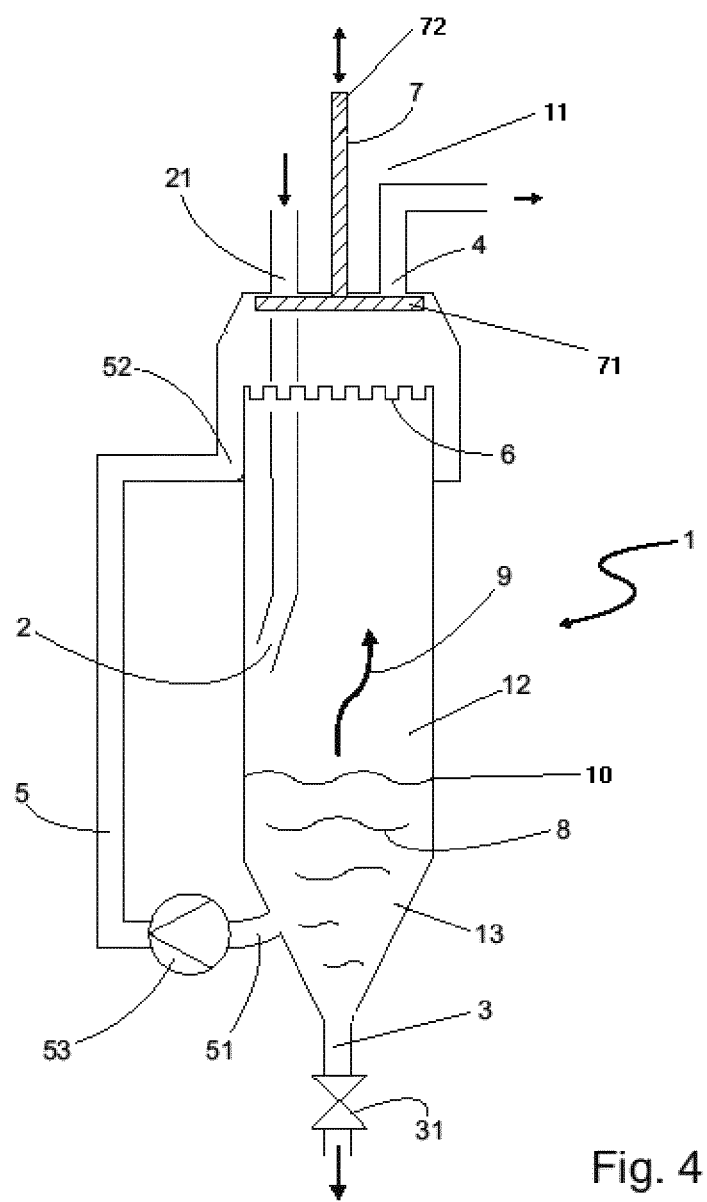
FIG. 4 shows an apparatus in another embodiment of the invention.

Another embodiment of the inventive apparatus is shown in FIG. 4. While the inlet orifice 2 in the first embodiment is immediately below the lower section 13, this in the embodiment according to FIG. 4 is disposed in the middle of the middle section 12. For performance of the process according to the invention, the two return orifices 51, 52 are connected to one another by a return line 5. In the return line 5 there is disposed a pump 53 set up to transport a liquid from the first return orifice 51 to the second return orifice 52.

In one embodiment of the process according to the invention for synthesizing a polymer (specifically the polyamide PA 6T/6I), an oligomer melt 8 is introduced through the inlet orifice 2 into the reaction space 1 and collects in the lower section 13 and in the lower part of the middle section 12 of the reaction space 1. A portion of the oligomer melt 8 is transported by means of the pump 53 through the return line 5 into an area at the top of the middle section 12 of the reaction space 1 and thence distributed by means of the distributing device 6 over the inner wall of the middle section 12 such that it is completely covered by a thin oligomer melt film. The recycled oligomer melt present in a return line 5 in an area at the top of the middle section 12 of the reaction space 1 or on the walls of the middle section 12 accounts for 10 percent by weight of all the oligomer melt present in the reaction space 1. The oligomer melt 8 is polymerized to give a polymer melt and this is removed, with the outlet tap 31 open, from the reaction space 1 through the first outlet orifice 3. Water leaves the reaction space 1 under reduced pressure in the gaseous state 9 through the second outlet orifice 4. The formation of deposits in an area at the top of the middle section 12 of the reaction space 1 is prevented by movement of the removal device 7.

The process according to the invention can be conducted as a batchwise operation, in which case conclusion of the reaction is followed by removal of the polymer melt from the reaction space 1 by opening the gate valve 31. Alternatively, a continuous process regime is also possible with the gate valve 31 constantly at least partly open, in which case the residence time of the oligomer melt in the reaction space 1 can be adjusted via the level thereof.

For comparison of the process according to the invention with a conventional process regime in a falling-film reactor, the inventive process regimes IE1 to IE7 in an apparatus according to FIG. 4 were compared to comparative experiments CE1 to CE9, in which the pump 53 was switched off. As a result of this, there was no return of any liquid through the return line 5, and so it was possible to simulate the situation in a conventional falling-film reactor. The model substances used for an oligomer melt were aqueous solutions of polyvinylpyrrolidone (Luviskol® from BASF SE) of different viscosities. As a gaseous substance, $CO_2$ was added to these in different proportions by mass, based in each case on the total mass of the solution. The process was conducted at room temperature and standard pressure. The results are shown in tables 1 and 2:

TABLE 1

| No. | Viscosity [mPa · s] | c($CO_2$) [wt. %] | Return flow rate [kg/h] | Deposits |
| --- | --- | --- | --- | --- |
| CE1 | 100 | 1 | — | yes |
| CE2 | 100 | 2 | — | yes |
| CE3 | 100 | 3 | — | yes |
| CE4 | 200 | 1 | — | yes |
| CE5 | 200 | 2 | — | yes |
| CE6 | 200 | 3 | — | yes |

TABLE 1-continued

| No. | Viscosity [mPa · s] | c(CO$_2$) [wt. %] | Return flow rate [kg/h] | Deposits |
|---|---|---|---|---|
| CE7 | 400 | 1 | — | yes |
| CE8 | 400 | 2 | — | yes |
| CE9 | 400 | 3 | — | yes |

TABLE 2

| No. | Viscosity [mPa · s] | c(CO$_2$) [wt. %] | Return flow rate [kg/h] | Deposits |
|---|---|---|---|---|
| IE1 | 700 | 1 | 1 | no |
| IE2 | 700 | 2 | 1 | no |
| IE3 | 700 | 3 | 1 | no |
| IE4 | 700 | 1 | 5 | no |
| IE5 | 10 000 | 1 | 1 | no |
| IE6 | 10 000 | 2 | 1 | no |
| IE7 | 10 000 | 3 | 1 | no |

It is evident that the formation of deposits in an area at the top of the middle section 12 of the reaction space 1 was avoidable only in the case of the inventive process regime. In the comparative experiments and in the inventive experiments, foam is formed in the middle section 12, but this attains its maximum after not more than 10 minutes and then remains constant.

The inventive apparatus and the process according to the invention enable reliable polymer synthesis with separation of a gaseous substance in the falling-film reactor, without any occurrence in this context, as known from the prior art, of deposits on the inner walls of the reaction space above the distributing device of the falling-film reactor.

LIST OF REFERENCE NUMERALS 1 reaction space
2 inlet orifice
3 first outlet orifice
4 second outlet orifice
5 return line
6 distributing device
7 removal device
8 oligomer melt
9 gaseous substance
10 liquid level
11 upper section
12 middle section
13 lower section
21 inlet line
31 gate valve
51 first return orifice
52 second return orifice
53 pump
71 removal head
72 round bar
73 screw nut
711 opening for inlet line
712 passage orifice
713 passage orifice
714 middle region of the removal head
715 edge of the removal head

The invention claimed is:

1. A continuous process for synthesizing a polymer with separation of a gaseous substance in an apparatus comprising
a reaction space (1) having an upper section (11), a middle section (12), and a lower section (13),
an inlet orifice (2) disposed in the middle section (12),
a first outlet orifice (3) disposed in the lower section (13),
a second outlet orifice (4) disposed in the upper section (11),
a first return orifice (51) disposed in the lower section (13),
a second return orifice (52) disposed beneath the upper section (11), where the first return orifice (51) and the second return orifice (52) are connected to one another by a return line (5) in which there is disposed a pump (53) set up to transport a liquid from the first return orifice (51) to the second return orifice (52),
a distributing device (6) which delimits the middle section (12) from the upper section (11), and
a removal device (7) disposed so as to be movable along the upper section (11), where the removal device (7) has a removal head (71) disposed on the inner wall at the top of the middle section (12) and where the removal head (71) makes contact with the inner wall at the top of the middle section (12) with deformation of the edges of the removal head (71), where
the inlet orifice (2) is connected by means of an inlet line (21) to a wall of the upper section (11), the removal head (71) having an orifice (711) through which the inlet line (21) is conducted,
comprising the following process steps:
a) feeding a prepolymer melt (8) into a middle section (12) of a reaction space (1) through an inlet orifice (2),
b) transporting a portion of the prepolymer melt (8) from a lower section (13) of the reaction space (1) disposed below the middle section (12) into an upper section (11) of the reaction space above the middle section (12) and distributing the prepolymer melt (8) over the inner wall of the middle section (12) by means of a distributing device (6),
c) polymerizing the prepolymer melt (8) to give a polymer melt,
d) removing the polymer melt from the reaction space (1) through a first outlet orifice (3) of the reaction space (1), and
e) removing a gaseous substance (9) from the reaction space (1) through a second outlet orifice (4) in the upper section (11),
wherein deposits on at least one inner wall of the upper section (11) are removed by a removal device (7), and
wherein the polymer is a semiaromatic polyamide comprising at least one repeat unit having an aromatic group and at least one repeat unit having an aliphatic or cycloaliphatic group in incorporated form.

2. The process according to claim 1, wherein the viscosity of the prepolymer melt (8) is at least 1 mPas.

3. The process according to claim 1, wherein the gaseous substance (9) is steam.

4. The process according to claim 1, wherein the polymer is a polyamide selected from the group consisting of
PA 6.T, PA 9.T, PA8.T, PA 10.T, PA 12.T, PA 6.I, PA 8.I, PA 9.I, PA 10.I, PA 12.I, PA 6.T/6, PA 6.T/10, PA 6.T/12, PA 6.T/6.I, PA6.T/8.T, PA 6.T/9.T, PA 6.T/10T, PA 6.T/12.T, PA 12.T/6.T, PA 6.T/6.I/6, PA 6.T/6.I/12, PA 6.T/6.I/6.10, PA 6.T/6.I/6.12, PA 6.T/6.6, PA 6.T/6.10, PA 6.T/6.12, PA 10.T/6, PA 10.T/11, PA 10.T/12, PA 8.T/6.T, PA 8.T/66, PA 8.T/8.I, PA 8.T/8.6, PA 8.T/6.I, PA 10.T/6.T, PA 10.T/6.6, PA 10.T/10.I, PA 10T/10.I/6.T, PA 10.T/6.I, PA 4.T/4.I/46, PA 4.T/4.I/6.6, PA 5.T/5.I, PA 5.T/5.I/5.6, PA 5.T/5.I/6.6, PA 6.T/6.I/6.6, PA MXDA.6, PA IPDA.I, PA IPDA.T, PA MACM.I, PA MACM.T, PA PACM.I, PA PACM.T, PA MXDA.I, PA MXDA.T, PA 6.T/IPDA.T, PA 6.T/MACM.T, PA 6.T/PACM.T, PA 6.T/MXDA.T, PA 6.I/6.I/8.T/8.I, PA 6.T/6.T/10.T/10.I, PA 6.T/6.I/IPDA.T/IPDA.I, PA 6.T/6.I/MXDA.T/MXDA.I, PA 6.T/6.I/MACM.T/MACM.I, PA 6.T/6.I/PACM.T/PACM.I, PA 6.T/10.T/IPDA.T, PA 6.T/12.T/IPDA.T, PA 6.T/10.T/PACM.T, PA 6.T/12.T/PACM.T, PA 10.T/IPDA.T, PA 12.T/IPDA.T, and copolymers and mixtures thereof.

* * * * *